United States Patent
Wang et al.

(10) Patent No.: US 11,746,924 B2
(45) Date of Patent: Sep. 5, 2023

(54) POSITION SENSOR FEEDBACK FOR HYDRAULIC PRESSURE DRIVEN INTERVAL CONTROL VALVE MOVEMENT

(71) Applicant: HALLIBURTON ENERGY SERVICES, INC., Houston, TX (US)

(72) Inventors: Ziquan Wang, Spring, TX (US); Michael John Christie, Aberdeen (GB); Robert Joseph Smith, Magnolia, TX (US); Aswin Balasubramanian, The Woodlands, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 656 days.

(21) Appl. No.: 16/971,265

(22) PCT Filed: Sep. 17, 2019

(86) PCT No.: PCT/US2019/051551
§ 371 (c)(1),
(2) Date: Aug. 19, 2020

(87) PCT Pub. No.: WO2021/054944
PCT Pub. Date: Mar. 25, 2021

(65) Prior Publication Data
US 2023/0094715 A1 Mar. 30, 2023

(51) Int. Cl.
*F16K 7/00* (2006.01)
*G05D 7/06* (2006.01)
(Continued)

(52) U.S. Cl.
CPC ....... *F16K 37/0083* (2013.01); *G05D 7/0623* (2013.01); *E21B 34/10* (2013.01); *E21B 2200/20* (2020.05)

(58) Field of Classification Search
CPC ... F16K 37/0083; G05D 7/0623; E21B 34/10; E21B 34/16; E21B 2200/20
See application file for complete search history.

(56) References Cited

U.S. PATENT DOCUMENTS

| | | | |
|---|---|---|---|
| 6,736,213 B2 | 5/2004 | Bussear et al. | |
| 7,557,339 B2 | 7/2009 | Poland et al. | |
| (Continued) | | | |

FOREIGN PATENT DOCUMENTS

| | | |
|---|---|---|
| WO | 2007005637 A2 | 1/2007 |
| WO | 2008104750 A1 | 9/2008 |

OTHER PUBLICATIONS

"Position Sensing Solutions for the Oil and Gas Industry", BEI 2005.
(Continued)

*Primary Examiner* — Manuel L Barbee
(74) *Attorney, Agent, or Firm* — NOVAK DRUCE CARROLL LLP (57) ABSTRACT

Techniques for correlating changing hydraulic pressure differentials with interval control valve (ICV) movements are contemplated. In some aspects, the disclosed technology includes include methods for applying, by a surface controller, a series of differential pressure values to a hydraulic-open line, receiving, from a position sensor, a corresponding valve position for each of the differential pressure values, and calculating a lag time, a move speed and a response delay for each of the first series of differential pressure values. In some aspects, the method can further include steps for generating an ICV positioning model based at least in part on the lag time, the move speed, and the response delay calculated for each of the first series of differential pressure values. Systems and computer-readable media are also provided.

20 Claims, 7 Drawing Sheets

(51) Int. Cl.
*E21B 34/10* (2006.01)
*F16K 37/00* (2006.01)

(56) References Cited

U.S. PATENT DOCUMENTS

| | | |
|---|---|---|
| 8,196,656 B2 | 6/2012 | Gissler |
| 8,237,443 B2 | 8/2012 | Hopmann et al. |
| 8,534,115 B2 | 9/2013 | Tomiyama et al. |
| 9,765,611 B2 | 9/2017 | Malone et al. |
| 2015/0098487 A1 | 4/2015 | Wang et al. |
| 2018/0266198 A1 | 9/2018 | Manum et al. |
| 2018/0347312 A1 | 12/2018 | Green et al. |
| 2019/0017368 A1* | 1/2019 | El Mallawany ........ E21B 47/09 |
| 2019/0242496 A1 | 8/2019 | Miller et al. |

OTHER PUBLICATIONS

International Search Report and Written Opinion; PCT Application No. PCT/US2019/051551; dated Jun. 12, 2020.

* cited by examiner

POSITION SENSOR FEEDBACK FOR HYDRAULIC PRESSURE DRIVEN INTERVAL CONTROL VALVE MOVEMENT

CROSS-REFERENCE TO RELATED APPLICATIONS

This application is a national stage entry of PCT/US2019/051551 filed Sep. 17, 2019, said application is expressly incorporated herein by reference in its entirety.

TECHNICAL FIELD

The present disclosure pertains to interval control valve (ICV) positioning and in particular, systems and methods for using position feedback to model ICV movements. In some aspects, ICV positioning models can be used to improve ICV maneuver accuracy.

BACKGROUND

Various tools and tool systems have been developed to control, select, and regulate the production of hydrocarbon fluids and other fluids produce downhole from subterranean wells. Downhole well tools, such as sliding sleeves, sliding side doors, interval control lines, safety valves, lubricated valves, and gas valves are representative examples of control that are deployed in wells.

Sliding sleeve ICVs and similar devices can be placed in various sections of a wellbore to control fluid flow from the corresponding formation section. For example, multiple ICVs can be placed in different isolated sections within production tubing to control fluid flow within the tubing section, and to co-mingle various fluids within the common production tubing interior.

Valve control is typically accomplished through the application of actuation signals that are provided through mechanical, direct pressure, pressure pulsing, electrical, electromagnetic, acoustic, and/or other mechanisms. For example, typical control mechanisms can involve simple mechanics, fluid logic controls, timers, and/or electronics. Interval control valve (ICV) activation is typically accomplished using electrical and hydraulic lines that can be used to control ICV positioning, without the need for reentry to the wellbore. In a typical ICV positioning deployment, one or more hydraulic lines can be used to control valve movements in an "open" direction, e.g., using a hydraulic-open line, and valve movements in a "closed" direction are controlled via a hydraulic—close line.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

As discussed in greater detail herein, the present disclosure provides techniques to model ICV maneuvers based on position changes caused by various applications of differential pressure. In particular, the disclosed techniques use a downhole position sensor to measure ICV positions following the application of different hydraulic pressure values on one or more ICV control lines, i.e., hydraulic-open and/or hydraulic close lines. Importantly, the techniques disclosed herein are not limited to ICV trim positioning, but may be applied to maneuvers performed in relation to a variety of other downhole tools.

Typically, there are two predominate approaches for controlling ICV flow trim: (1) using a downhole control module, and (2) through surface positioning. Both techniques may not be optimal. Downhole control modules typically enable an operator to open a valve in a step-by-step manner (incrementally), for example, by releasing a pre-defined amount of control fluid from a control piston. Some control valves can be moved through a pre-defined number of pre-set positions, e.g., up to 11 pre-set positions for some conventional control modules. However, step-wise trim movement can be time consuming, requiring a sequence that includes: pressuring a control line, performing a control check, and performing a move for each pre-set position. In some downhole control modules, movement from a higher position (e.g., position '10') to a lower position (e.g., position '5'), requires a step-reset (e.g., a movement to position '0', then step-by-step moves to position '5'), making certain maneuvers particularly time consuming. Additionally, some downhole control modules contain many moving parts, making them costly and subject to high failure rates.

Surface positioning techniques may remove the need for downhole control hydraulics, relying solely on surface control systems for ICV positioning. Such techniques require that calibration be performed prior to deployment in order to correlate parameters defining volume and/or pressurization times with specific move types. However, due to line length, there can be a lag between surface pressure application, and downhole pressure changes registered at the ICV. In the absence of downhole hydraulics, some ICV movement is likely to occur as control lines are pressurized. Differences in pressurization lag times and movements are dependent on line volumes/lengths, and can therefore vary between ICV/control line pairs. Such differences can be difficult to account for during the calibration phase. Additionally, final ICV deployments can be dependent on downhole environmental factors, such as temperature, that are also difficult to account for during calibration. Such factors increase the difficulty of generating pre-calibration models for surface positioning systems.

Aspects of the disclosed technology address the foregoing limitations by providing a novel valve positioning system that includes at least one downhole position sensor used in conjunction with a surface controller. The position sensor can provide direct ICV (trim) position feedback to the surface controller, e.g., using either wired or wireless communication. As such, while the tool is operating, the surface controller can collect data relating to various ICV maneuvers, including time, and data on current ICV positions and pressure applications. Collected position and control line data can facilitate the creation of unique ICV positioning models, for example, that facilitate the ability to make accurate position control predictions under actual wellbore environmental conditions.

As discussed in further detail below, ICV positioning models can be generated from various valve parameters determined while executing ICV maneuvers. As used herein, valve parameters can include any properties that are directly measured regarding various valve characteristics, including properties relating to valve operation or performance under certain operation conditions. Valve parameter can include, but are not limited to, lag time(s), move speed(s), response delay(s), acceleration, applied pressure, reaction pressure, differential pressure, temperature, and/or a flow rate through the tube, etc.

As described herein, ICV positioning models can include predictive models based on essentially any type of data, such as historic calibration data and/or environmental measurements that can be used to facilitate predictive calculations regarding ICV movement. By way of example, an ICV positioning model can include a lookup table of various ICV parameters that are determined during calibration. As discussed in further detail below, ICV positioning models can be adapted/updated based on feedback provided from one or more position sensors, e.g., to correct for errors caused by changing downhole environmental conditions or changing tool conditions.

Figure 1:
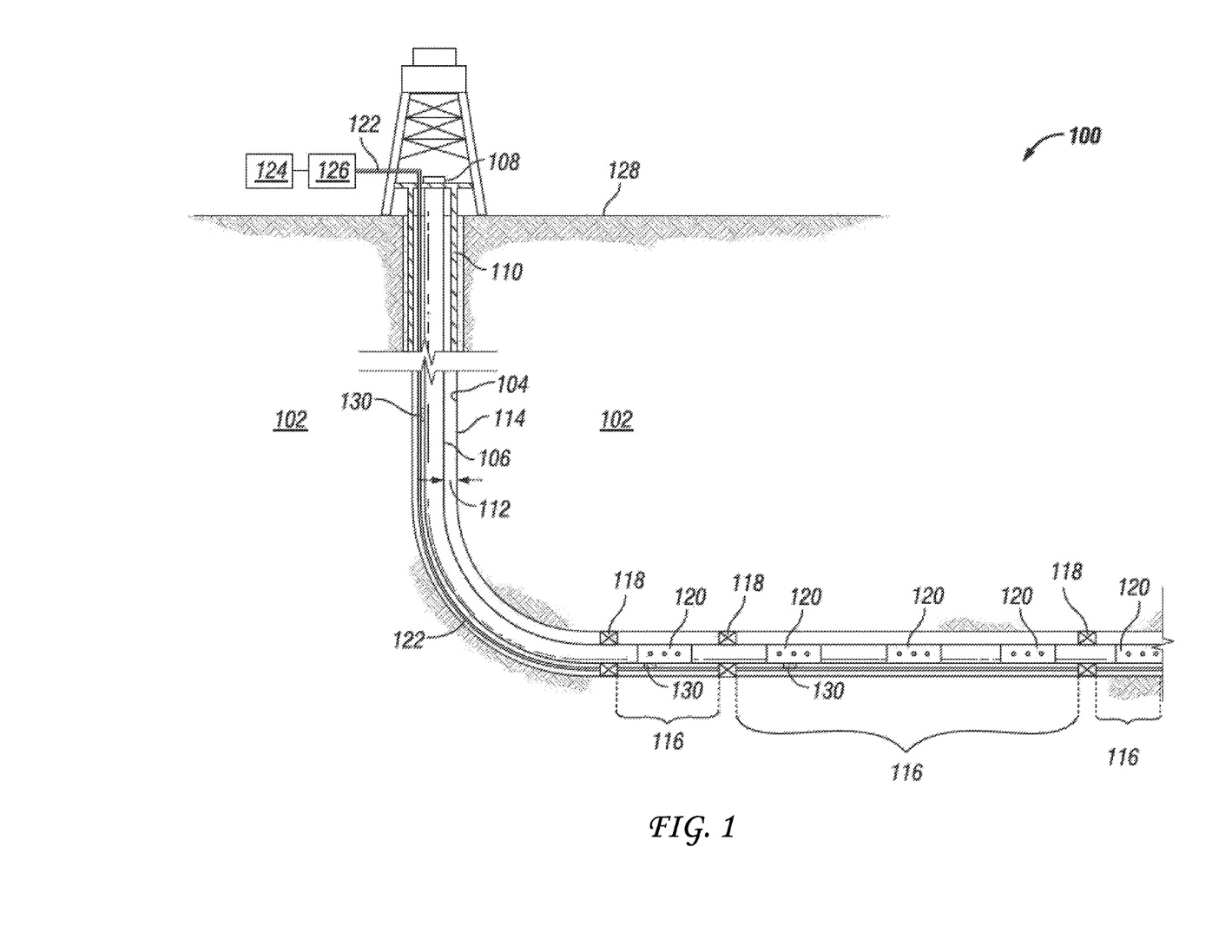
FIG. 1 is a schematic view of a well system formed within a formation, according to one or more embodiments.
Figure 2:
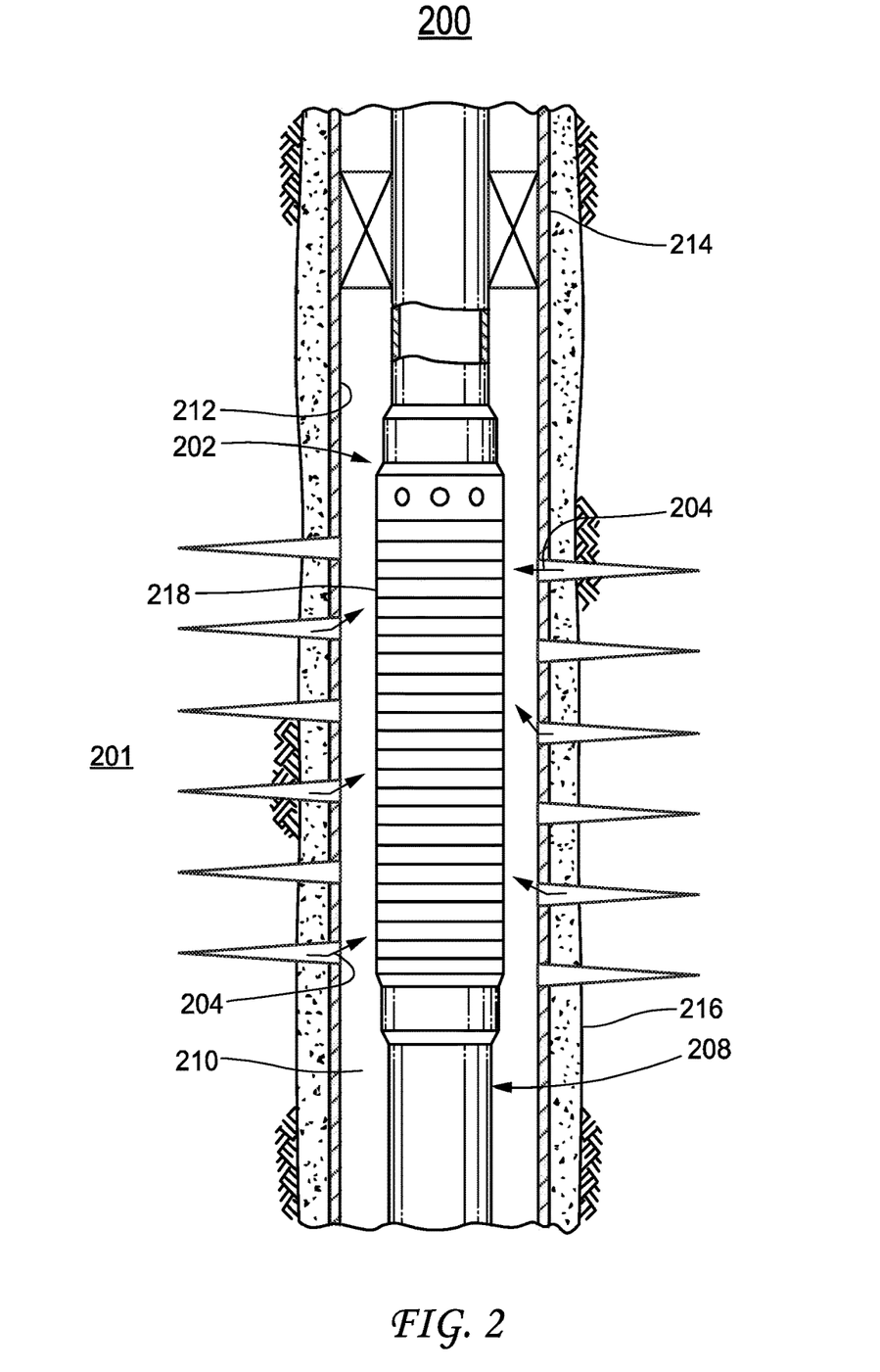
FIG. 2 is a cut-away view of a wellbore environment that includes an interval control valve device.

The disclosure now turns to FIG. 1 and FIG. 2 to provide a brief introductory description of the larger environmental context in which some of the concepts, methods, and techniques disclosed herein can be practiced.

FIG. 1 is a schematic view of a well system 100 formed within a formation 102, according to one or more embodiments. The well system 100 includes a wellbore 104, such as a vertical wellbore as illustrated or the wellbore 104 may include a horizontal or directional well. The wellbore 104 is formed in the formation 102 which is made of several geological layers and includes one or more hydrocarbon reservoirs. In example embodiments, a tubing string 106 extends from a wellhead 108 into the wellbore 104 to traverse the formation 102. The tubing string 106 can include a well completion string, a production string, a drill string, and so forth.

As depicted, the wellbore 104 is cased with casing 110 to maintain the structure and prevent the wellbore 104 from collapsing inward. In some examples, a portion of the wellbore 104 is not cased and may be referred to as "open hole." An annulus area 112 is formed between the tubing string 106 and the casing 110 or a wellbore wall 114.

Fluids produced in the wellbore 104 or fluids injected into the wellbore 104 (e.g., drilling fluids, completion fluids, or treatment fluids) may flow within the tubing string 106 and the annulus area 112. For instance, a fluid produced from the wellbore 104 enters the annulus area 112 from the formation 102 to enter the tubing string 106. The tubing string 106 carries the fluid uphole to be delivered to various surface facilities for processing. In other configurations, fluid can be injected into wellbore 104 to flow through the tubing string 106, for example, for fracturing treatment or chemical treatment.

Hydraulically actuatable devices, tools and equipment can be placed in the wellbore 104 to carry out various operations, for example, to select or regulate the flow of the fluid. The actuatable devices can include sliding sleeves, flow regulators, flow control valves, packers, FIG. 2 is a cut-away view of a wellbore environment 200 that includes an interval control valve (ICV) 202. In this example, ICV 202 is used to variably restrict flow of fluid 204 from a formation 201 into an interior flow passage 206 of a tubular string 208 (such as a production tubing string, a string, etc.). In the wellbore environment 200, an annulus 210 is formed radially between tubular string 208 and wellbore 212 that is lined with casing 214 and cement 216. Fluid 204 flows from formation 201 into annulus 210, then through ICV 202, and then into flow passage 206 for eventual production to the surface. It is understood that flow regulating system (ICV) 202 and its use in wellbore 212 as depicted in FIG. 2 are merely examples of a vast number of possible variations that can incorporate the principles of this disclosure. As such, should be clearly understood that the scope of this disclosure is not limited to the details of the various elements, devices, and systems illustrated herein. For example, it is not necessary for wellbore 212 to be cased, cemented or vertical as depicted in FIG. 2. It is also not necessary for fluid 204 to flow from the formation 212 into flow passage 206, since an injection, conformance or other operations, fluid can flow in opposite direction it is not necessary for fluid 204 to flow through a well screen 218 or for the fluid to flow through a well screen prior to flowing through ICV 202. These are but a few of the vast number of changes that can be made to the well depicted in FIG. 2, while still remaining within the scope of this disclosure.

Figure 3:
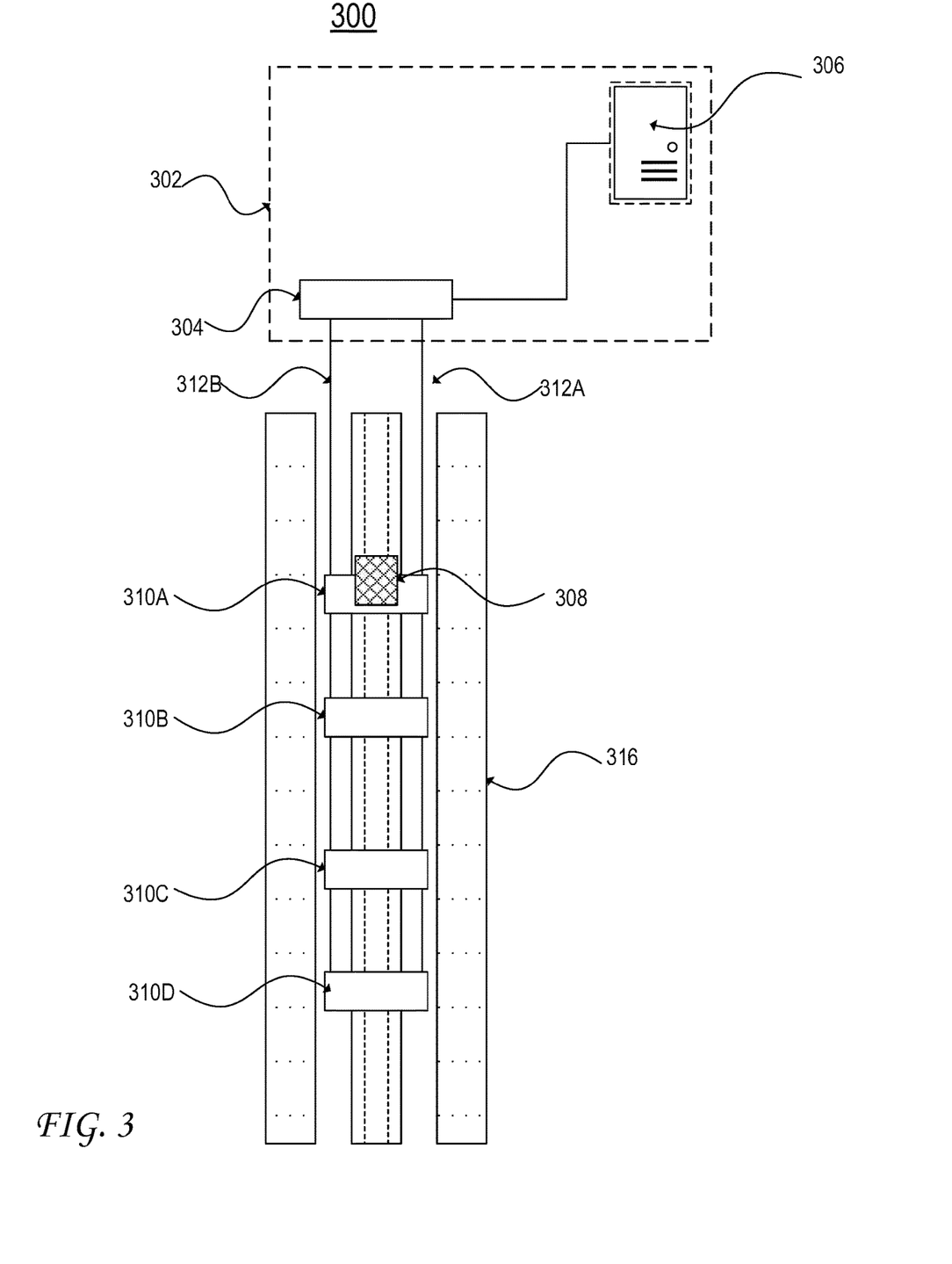
FIG. 3 is a cut-away view of a wellbore environment that includes an ICV positioning system of the disclosed technology.

FIG. 3 is a schematic view of a wellbore environment 300 that includes an ICV positioning system of the disclosed technology. Environment 300 includes a surface controller 302 that includes a hydraulic control module 304 coupled to processors/controller 306. In turn, surface controller 302 is communicatively coupled to an ICV position sensor 308 that is configured to detect a position of one or more valves (ICVs) 310.

In the example depicted environment 300, position sensor 308 is configured to detect a position for corresponding ICV 310A. However, it is understood that one or more position sensors can be configured for detecting positions of one or more various ICVs 310, depending on the preferred implementation. Additionally, processor/controllers 306 are illustrated as a discrete computing system that is coupled to hydraulic control module 304; however, it is understood that processors 306 and hydraulic control module 304 may be integrated as a discrete physical unit. Alternatively, processors/controllers 306 can be implemented using a variety of distributed computing techniques, including but not limited to the use of various physical/virtual computing devices, for example, that are instantiated in a cloud computing environment. As such, communication between processors/controllers 306 and hydraulic control module 304 can be accomplished using wired or wireless communications that are routed over one or more computer networks, such as the Internet.

In operation, ICVs 310 are variously controlled by one or more hydraulic open/closed lines 312 coupled to hydraulic control module 304, as part of surface controller 302. In the illustrated example, hydraulic control module 304 is configured to control movement of ICV 310A using hydraulic open line 312A, and hydraulic close line 312B. In such approaches, differential pressure increases on hydraulic-open line 312A can cause ICV 310 to move in an open position, enabling greater inflow volumes from wellbore 316. Conversely, differential pressure increases on hydraulic-close line 312B can cause ICV 310 to move in a closed position, restricting flow volumes originating from wellbore 316. It is understood that various other open/closed lines may be used to control any one or more of valves 310, without departing from the scope of the disclosed technology.

Position sensor 308 can be used to report/verify a position of ICV 310A after a maneuver has been initiated by surface controller 302, e.g., using hydraulic control model 304. In some implementations, position sensor 308 can be a battery-operated device, for example, that is configured to communicate ICV positions to surface controller 302 using a wireless communication means. Alternatively, position sensor 308 may be line powered, and configured to communicate with surface controller 302 using a wired channel.

Various positions of ICV 310A can be correlated with pressure differentials provided at the initiation of the valve move by hydraulic control module 304. For example, processors/controllers 306 can be configured to record various pressure differentials provided on hydraulic open line 312A, and hydraulic close line 312B, with final positions of ICV 310A. As discussed in further detail below, by correlating various pressure differentials without movement (position) behavior, surface controller 302 can generate an ICV position model that can be used to accurately reposition ICV 310A without the need for position sensor 308.

Figure 4:
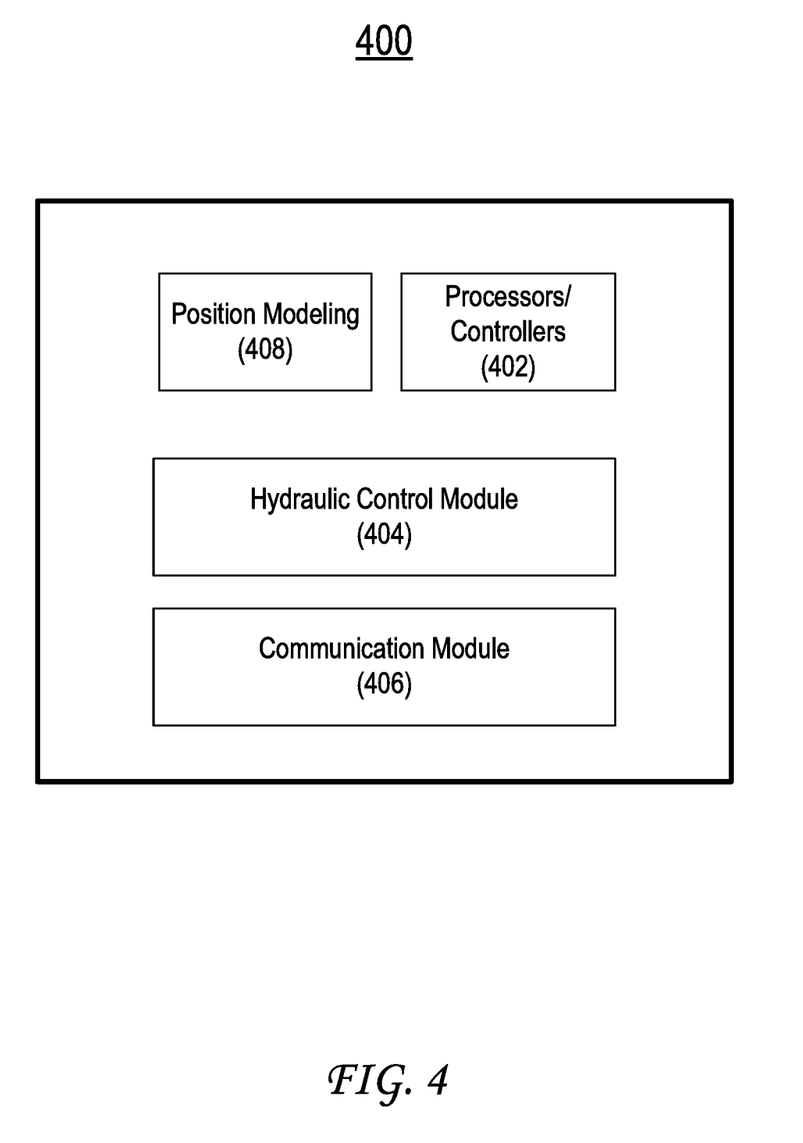
FIG. 4 is a schematic diagram of a surface controller that can be used to implement an ICV positioning system of the disclosed technology.

FIG. 4 is a schematic diagram of a surface controller 400 that can be used to implement an ICV positioning system of the disclosed technology. Surface controller 400 includes one or more processors/controllers 402, a hydraulic control module 404, a communication module 406, and a position modeling unit 408.

In practice, service controller 400 is configured to control the opening and closing of one or more interval control valves, for example, through changes to differential pressure applied to one or more hydraulic control lines (not illustrated) that are coupled to hydraulic control module 404. Precise valve positioning information can be received subsequent to apply valve movements. For example, communication module 406 can be configured to receive valve positions from a position sensor, such as, position sensor 308 discussed above with respect to FIG. 3.

After collecting multiple measurements of applied pressure values (e.g., applied by hydraulic control model 404), and corresponding ICV position information (e.g., received from a position sensor by communication model 406), an ICV position model can be generated by position modeling unit 408. By way of example, processors/controllers 402 can be configured to calculate various parameters used to generate an ICV position model. Such parameters can include, but are not limited to, one or more of: a lag time, a move speed, and a response delay for each valve maneuver.

In some aspects, the computed lag time can represent an amount of time elapsed between application of the differential pressure (at the surface) and the initiation of ICV movement. The computed move speed can represent an average speed of ICV movement from a point at which movement is first observed (e.g., by the position sensor), to a point at which differential pressure is removed by surface controller 400. The response delay can represent a distance traveled after differential pressure has been removed by surface controller 400. In some implementations, during the initial calibration phase, differential pressure may be removed by surface controller 400 at a point in time when the target ICV position is obtained. Subsequently, once a response delay value has been established for a particular ICV maneuver, closed loop moves (aided by the position sensor) can be made more accurate by applying an overshoot/undershoot correction to the target position. For example, pressure can be removed by the hydraulic control module 404 before the target ICV position is obtained, for example, to account for response delay movements, which take the ICV to the final target position. A graphical example of the relationship between applied pressure and ICV position, over time, is provided in FIG. 5.

Figure 5:
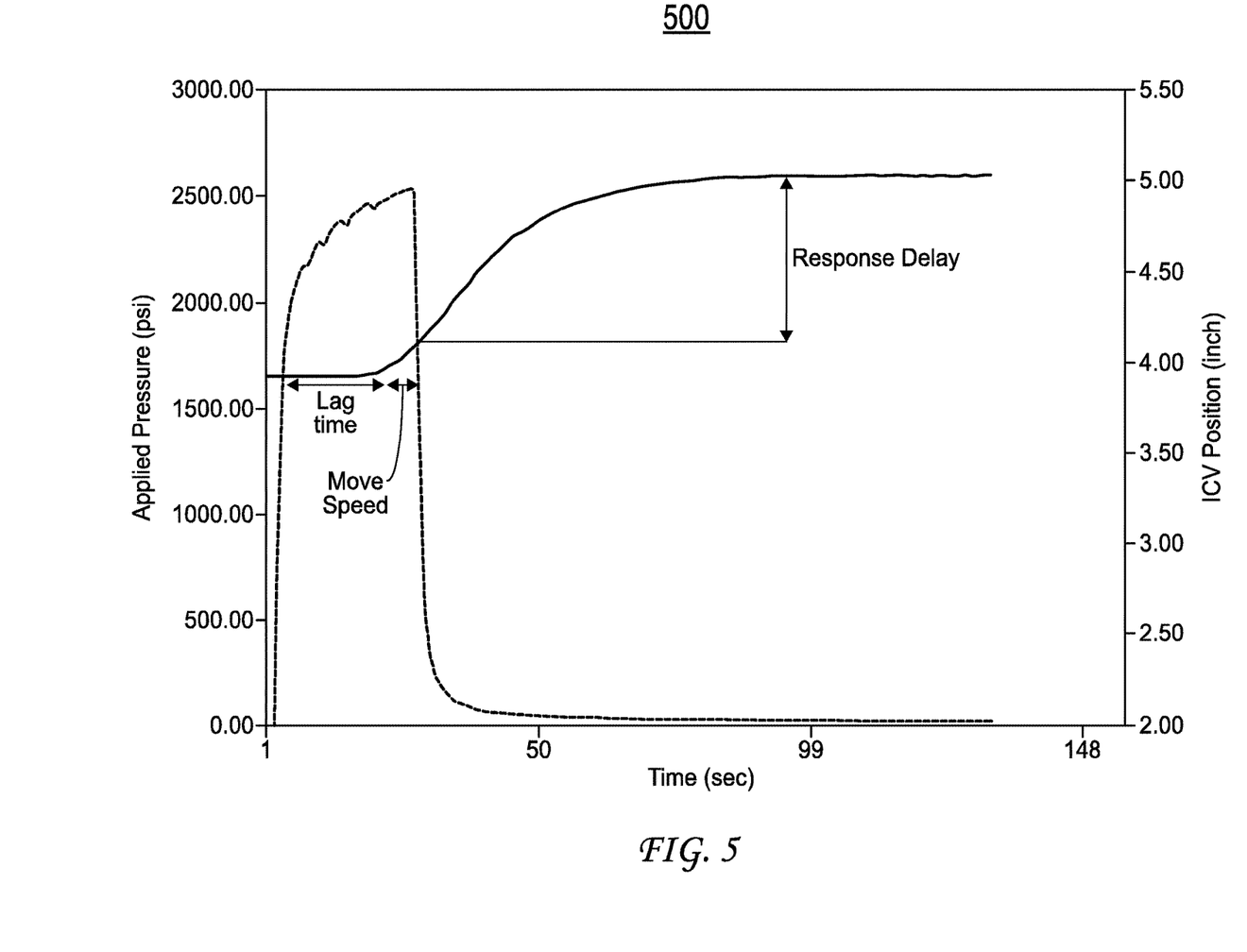
FIG. 5 is a graph of ICV positions associated with an applied pressure over time.

Specifically, FIG. 5 illustrates ICV positions (in inches) associated with various applied pressures (in psi) over time. Additionally, FIG. 5 depicts a lag time, move speed, and response delay for a maneuver performed in which pressure is used to increase valve position (e.g., in an open maneuver). In some implementations, the lag time and move time measurements can be recorded during normal (closed loop) operations and used to estimate future movements. For example, the lag time, move time, and response delay can be used to determine the pressure differentials and pressure application times needed to execute various ICV maneuvers.

In implementations where the position sensor is in continued use, discrepancies between estimated time/pressure parameters and actual ICV position changes can be used to determine when parameter re-calibration is needed. By way of example, if the position sensor registers discrepancies between a predicted ICV position change and a measured change, then notifications can be automatically provided to an operator to indicate that re-calibration may be needed.

Alternatively, in implementations wherein the position sensor is unavailable (e.g., in battery powered operations, or in the case of failure of a line powered device), then ICV positioning models based on historic ICV maneuver data can be used to calculate an amount of time and/or pressure needed to move the ICV to a desired target position. By way of example, the ICV positioning model may include averages of all recorded lag times, move speeds, and response delays for each type of maneuver that can be performed with the ICV. As such, the ICV positioning model could then be used to calculate various pressure values and pressure application times needed to achieve a desired ICV position. By way of example, a move time can be provided by the relationship if equation 1:

$$MT = ((\text{Absolute}(TP-CP) - \text{Response Delay})/\text{Move Speed} + \text{Lag Time} \quad (1)$$

where, MT is a computed move time, TP is a target ICV position, and CP is a current ICV position.

In some implementations, an ICV positioning model can include measured parameters for a variety of ICV maneuvers, including steps between discrete positions. By way of example, move types having unique calibration parameters can include: an open move from a fully closed position; an open move from a partially open position (where the previous move was in the open direction); an open move from a partially open position (where the previous move was in the close direction); a close move from a fully open position; a close move from a partially open position (e.g., where the previous move was in the open direction); and a close move from a partially open position (e.g., where the previous move was in the close direction).

In some approaches, the ICV positioning model can account for parameter variations that can occur when other downhole tools are being opened/closed. For example, compensation pressure can be required on the hydraulic-open line of a tool to prevent undesired movement when one or more other tools are being closed. To determine compensation delays for various ICV maneuvers, two values can be calculated using the position sensor. First, the position sensor can be used to measure/compute a first time lag between full pressure application to a hydraulic-open line of another ICV and the beginning of movement for an ICV under calibration, (e.g., with no pressure applied to the open line of the ICV being calibrated). Second, the position sensor can be used to compute a second lag time, for example, between a time when a regulated pressure is applied to a hydraulic-open line of an ICV under calibration and the beginning of ICV movement (e.g., with no pressure applied on the common close line). In some aspects, the compensation delay is determined by subtracting the second lag time from the first lag time, wherein the regulated pressure required for each ICV can be established using existing calibration methods.

In some implementations, an ICV positioning model may account for changes between discrete valve positions states. By modeling specific parameters at each transition, the ICV position model can then account for varying levels of friction and other environmental factors that can affect move speeds. By way of example, the valve positioning system can monitor move speeds for each ICV position transition, e.g., 1 to 2, 2 to 3, 3 to 4, etc., during the closed loop control phase. The positioning system could then use relevant values (e.g., referring to an ICV positioning model) to calculate/predict move times during open loop operation. For example, if the valve positioning system was to perform an open loop move from position 1 to position 3, then it could base the move time calculation on a combination of move speeds for transitions from position 1 to position 2, and position 2 to position 3.

In some implementations, an ICV positioning model can include a database or lookup table of all actuation-time-durations/pressure-value pairs for every possible ICV maneuver. Such approaches can reduce potential errors, but may require more time to collect data, and more memory for data storage. In some implementations, the ICV positioning model can also include established delay times for each target position for each move direction.

In some aspects, an initial ICV positioning model can be created, for example, based on values established in a lab during a system integration test, and prior to production use. The initialized ICV positioning model can be later adjusted using feedback from a position sensor. In some alternatives, a learning algorithm can be used to modify the initial ICV positioning model based on feedback from the actual environment, for example, based on measured position values provided by the position sensor. By way of example, differences between predicted ICV positions and actual measured positions (e.g., as reported by the position sensor) can be used to automatically update the ICV positioning model.

As mentioned above, downhole environmental characteristics can influence valve movement. Such factors can include, but are not limited to: temperature, hydrostatic pressure, differential pressure, and/or positions of one or more other ICVs. In some implementations, an ICV position model could include measurements for one or more of the foregoing environmental variables. By way of example, by performing a regression analysis it may be determined how the various environmental variables influence the calibration parameters. As such, the ICV positioning model can be informed by measured changes to different environmental variables in the wellbore, for example, that are collected by various other downhole sensors. A process for generating an ICV positioning model is discussed in further detail with respect to FIG. 6.

Figure 6:
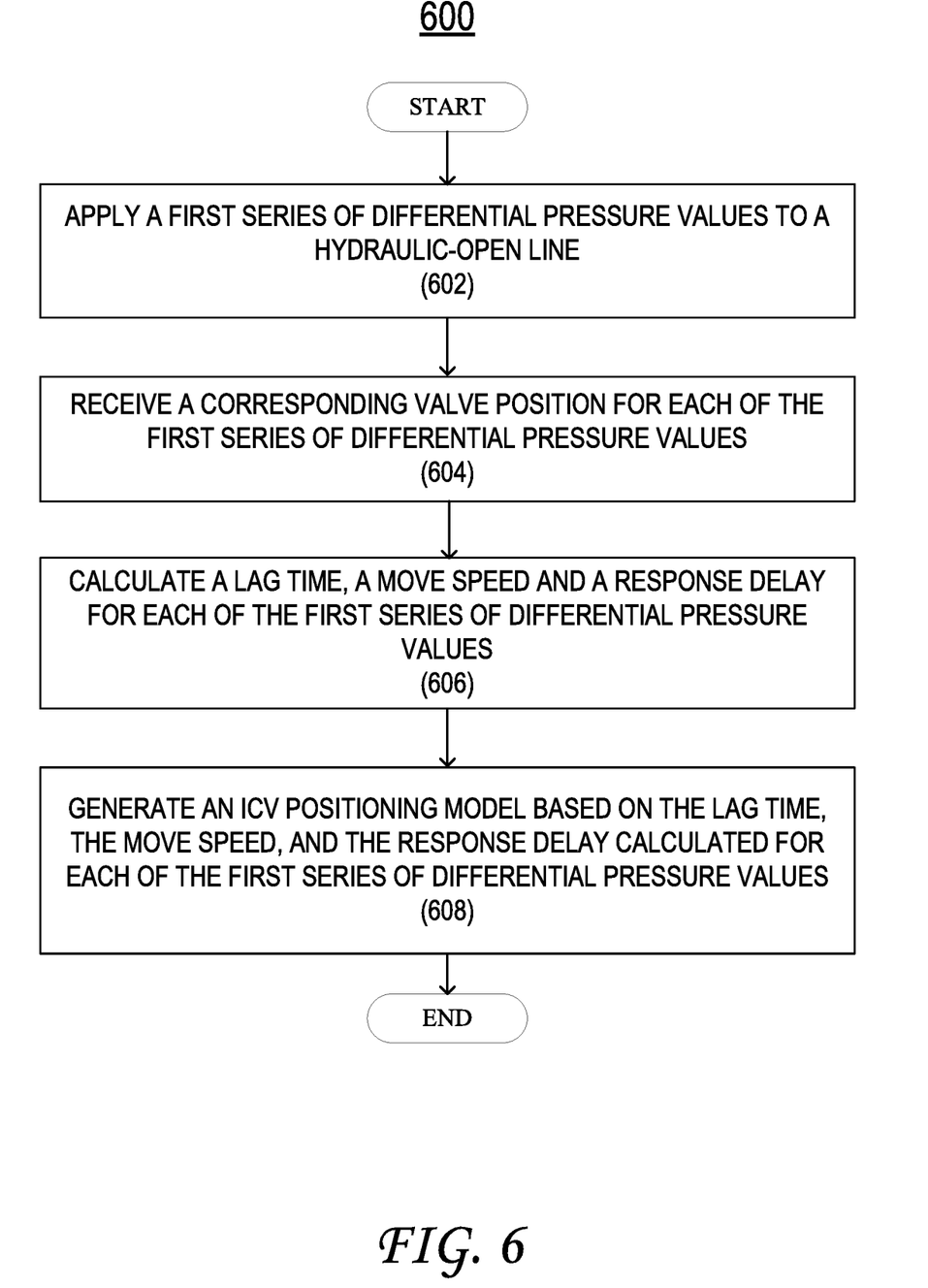
FIG. 6 is a process for generating an ICV positioning model, according to some aspects of the disclosure.

Specifically, FIG. 6 is a process for generating an ICV positioning model 600, according to some aspects of the disclosure. Process 600 begins with step 602 in which a first series of differential pressure values are applied to a hydraulic open line configured for controlling an ICV position. Hydraulic pressure may be applied by a surface controller, for example via a control line 312A, as discussed above with respect to FIG. 3, which is configured to move in ICV position in an "open" direction. The first series of differential pressure values may be applied as part of a calibration process, for example, to determine one or more motion parameters relating to a particular ICV. In some aspects, each of the differential pressure values that are applied can be spaced and timed, for example, to allow the valve to come to complete stop at its new resting position before a subsequent pressurized maneuver is performed.

In step 604, a corresponding valve position for each of the first series of differential pressure values is received. In some aspects, valve positions (e.g., associated with each of the pressure values applied at step 602), are measured by a downhole position sensor and communicated back to a surface controller. As discussed above, position sensor communication with the surface controller can be accomplished using wired or wireless communication, for example, that is managed by a communication module (e.g. communication module 406) of the surface controller.

In step 606, various parameters associated with each of the first series of differential pressure values are determined/calculated. By way of example, a lag time, a move speed, and a response delay can be calculated for each of the first series of differential pressure values applied in step 602. As discussed above with respect to FIG. 5, the computed lag time can represent a period of time elapsed between an initial application of the differential pressure and a beginning of ICV movement. The computed move speed can represent an average speed of ICV movement from a point at which movement is first observed, to a point at which differential pressure is removed. Finally, the response delay can represent a distance traveled after differential pressure has been removed.

In step 608, an ICV positioning model is generated based on the lag time, the move speed, and the response delay calculated in step 606. As discussed above, the ICV positioning model can include any data that can be used to facilitate predictions about future ICV maneuvers. By way of example, the ICV positioning model can include one or more parameters that are measured and/or calculated based on steps 602-606, discussed above. In some aspects, the ICV positioning model may include a lookup table of pressure/time pairs for each ICV maneuver type. For example, the ICV positioning model can include move times for each ICV position, and for each transition between ICV interval states, etc.

Figure 7:
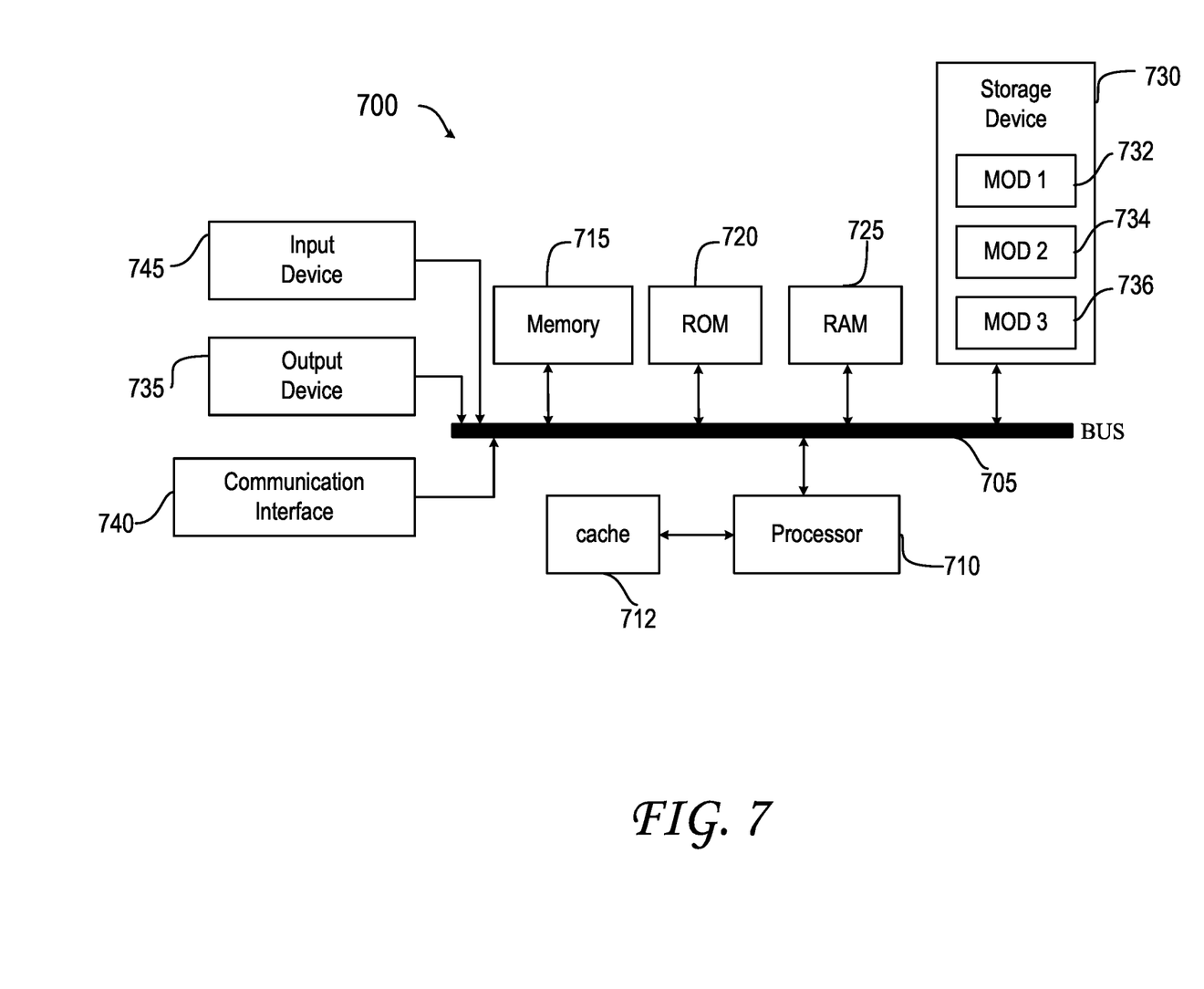
FIG. 7 is a schematic diagram of an example system embodiment.

FIG. 7 illustrates an exemplary computing system for use with example tools and systems (e.g., downhole tool 26, downhole tool 34, surface equipment, and the like). The more appropriate embodiment will be apparent to those of ordinary skill in the art when practicing the present technology. Persons of ordinary skill in the art will also readily appreciate that other system embodiments are possible.

Specifically, FIG. 7 illustrates system architecture 700 wherein the components of the system are in electrical communication with each other using a bus 705. System architecture 700 can include a processing unit (CPU or processor) 710, as well as a cache 712, that are variously coupled to system bus 705. Bus 705 couples various system components including system memory 715, (e.g., read only memory (ROM) 720 and random access memory (RAM) 735), to processor 710. System architecture 700 can include a cache of high-speed memory connected directly with, in close proximity to, or integrated as part of the processor 710. System architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. Memory 715 can include multiple different types of memory with different performance characteristics. Processor 710 can include any general purpose processor and a hardware module or software module, such as module 1 (732), module 2 (734), and module 3 (736) stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction with the computing system architecture 700, an input device 745 can represent any number of input mechanisms, such as a microphone for speech, a touch-sensitive screen for gesture or graphical input, keyboard, mouse, motion input, speech and so forth. An output device 742 can also be one or more of a number of output mechanisms. In some instances, multimodal systems can enable a user to provide multiple types of input to communicate with the computing system architecture 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 735, read only memory (ROM) 720, and hybrids thereof.

Storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, output device 742, and so forth, to carry out various functions of the disclosed technology.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

STATEMENTS OF THE DISCLOSURE

Statement 1: a valve positioning system including an interval control valve (ICV) coupled to at least one hydraulic-open line and at least one hydraulic-dose line, a position sensor coupled to the ICV, wherein the position sensor is configured to measure a position of the ICV, a surface controller coupled to the hydraulic-open line and the hydraulic-dose line, and wherein the surface controller comprises one or more processors configured to perform operations for: applying a first series of differential pressure values to the hydraulic-open line, receiving a valve position for each of the first series of differential pressure values, from the position sensor; and calculating one or more first valve parameters for each of the first series of differential pressure values.

Statement 2: the system of statement 1, wherein the surface controller is further configured to perform operations for: generating an ICV positioning model based at least in part on the one or more first valve parameters.

Statement 3: the system of any of statements 1-2, wherein the surface controller is further configured to perform operations for: applying a second series of differential pressure values to the hydraulic-close line, receiving valve position for each of the second series of differential pressure values, from the position sensor; and calculating one or more second valve parameters for each of the second series of differential pressure values.

Statement 4: the system of any of statements 1-3, wherein the one or more first valve parameters comprises at least one of: a lag time, a move speed, or a response delay that is based on the first series of differential pressure values.

Statement 5: the any of statements 1-4, wherein calculating the one or more first valve parameters is based on a temperature of the ICV.

Statement 6: wherein calculating the one or more first valve parameters is based on a position of one or more other ICVs.

Statement 7: the system of any of statements 1-6, wherein the position sensor comprises a battery, and is configured to communicate with the surface controller via a wireless channel.

Statement 8: system of any of statements 1-7, wherein the position sensor is coupled to the surface controller via a wired communication channel.

Statement 9: a method for modeling an interval control valve (ICV) position, comprising: applying, by a surface controller, a first series of differential pressure values to a hydraulic-open line, receiving, from a position sensor, a corresponding valve position for each of the first series of differential pressure values, calculating one or more first valve parameters for each of the first series of differential pressure values; and generating an ICV positioning model based at least in part on the first valve parameters calculated for each of the first series of differential pressure values.

Statement 10: the method of statement 9, further comprising: applying a second series of differential pressure values to a hydraulic-close line, receiving, from the position sensor, a corresponding valve position for each of the second series of differential pressure values, and calculating one or more second valve parameters for each of the second series of differential pressure values.

Statement 11: the method of any of statements 9-10, wherein the one or more first valve parameters comprises at least one of: a lag time, a move speed, and a response delay for each of the first series of differential pressure values.

Statement 12: the method of any of statements 9-11, wherein at least one of the first valve parameters is based on a temperature of the ICV.

Statement 13: the method of any of statements 9-12, wherein calculating the first valve parameters is further based on a position of one or more other ICVs.

Statement 14: the method of any of statements 9-13, wherein the position sensor comprises a battery, and is configured to communicate with the surface controller via a wireless channel.

Statement 15: a tangible, non-transitory, computer-readable media having instructions encoded thereon, the instructions, when executed by a processor, are operable to perform operations for: applying, by a surface controller, a first series of differential pressure values to a hydraulic-open line, receiving, from a position sensor, a corresponding valve position for each of the first series of differential pressure values, calculating one or more first valve parameters for each of the first series of differential pressure values, and generating an ICV positioning model based at least in part on the first valve parameters calculated for each of the first series of differential pressure values.

Statement 16: the tangible, non-transitory, computer-readable media of statement 15, further comprising: applying a second series of differential pressure values to a hydraulic-close line, receiving, from the position sensor, a corresponding valve position for each of the second series of differential pressure values, calculating one or more second valve parameters for each of the second series of differential pressure values.

Statement 17: the tangible, non-transitory, computer-readable media of any of statements 15-16, wherein the one or more first valve parameters comprises at least one of: a lag time, a move speed, and a response delay for each of the first series of differential pressure values.

Statement 18: the tangible, non-transitory, computer-readable media of any of statements 15-17, wherein at least one of the first valve parameters is based on a temperature of the ICV.

Statement 19: the tangible, non-transitory, computer-readable media of any of statements 15-18, wherein calculating the first valve parameters is further based on a position of one or more other ICVs.

Statement 20: the tangible, non-transitory, computer-readable media of any of statements 15-19, wherein the position sensor comprises a battery, and is configured to communicate with the surface controller via a wireless channel.

What is claimed is:

1. A valve positioning system comprising:
    an interval control valve (ICV) coupled to at least one hydraulic-open line and at least one hydraulic-close line;
    a position sensor coupled to the ICV, wherein the position sensor is configured to measure a position of the ICV; and
    a surface controller coupled to the hydraulic-open line and the hydraulic-close line, and wherein the surface controller comprises one or more processors configured to perform operations for:
        applying a first series of differential pressure values to the hydraulic-open line;
        receiving a valve position for each of the first series of differential pressure values, from the position sensor; and
        calculating one or more first valve parameters for each of the first series of differential pressure values.

2. The system of claim 1, wherein the surface controller is further configured to perform operations for:
    generating an ICV positioning model based at least in part on the one or more first valve parameters.

3. The system of claim 1, wherein the surface controller is further configured to perform operations for:
    applying a second series of differential pressure values to the hydraulic-close line;
    receiving valve position for each of the second series of differential pressure values, from the position sensor; and
    calculating one or more second valve parameters for each of the second series of differential pressure values.

4. The system of claim 1, wherein the one or more first valve parameters comprises at least one of: a lag time, a move speed, or a response delay that is based on the first series of differential pressure values.

5. The system of claim 1, wherein calculating the one or more first valve parameters is based on a temperature of the ICV.

6. The system of claim 1, wherein calculating the one or more first valve parameters is based on a position of one or more other ICVs.

7. The system of claim 1, wherein the position sensor comprises a battery, and is configured to communicate with the surface controller via a wireless channel.

8. The system of claim 1, wherein the position sensor is coupled to the surface controller via a wired communication channel.

9. A method for modeling an interval control valve (ICV) position, comprising:
applying, by a surface controller, a first series of differential pressure values to a hydraulic-open line;
receiving, from a position sensor, a corresponding valve position for each of the first series of differential pressure values;
calculating one or more first valve parameters for each of the first series of differential pressure values; and
generating an ICV positioning model based at least in part on the first valve parameters calculated for each of the first series of differential pressure values.

10. The method of claim 9, further comprising:
applying a second series of differential pressure values to a hydraulic-close line;
receiving, from the position sensor, a corresponding valve position for each of the second series of differential pressure values; and
calculating one or more second valve parameters for each of the second series of differential pressure values.

11. The method of claim 9, wherein the one or more first valve parameters comprises at least one of: a lag time, a move speed, and a response delay for each of the first series of differential pressure values.

12. The method of claim 9, wherein at least one of the first valve parameters is based on a temperature of the ICV.

13. The method of claim 9, wherein calculating the first valve parameters is further based on a position of one or more other ICVs.

14. The method of claim 9, wherein the position sensor comprises a battery, and is configured to communicate with the surface controller via a wireless channel.

15. A tangible, non-transitory, computer-readable media having instructions encoded thereon, the instructions, when executed by a processor, are operable to perform operations for:
applying, by a surface controller, a first series of differential pressure values to a hydraulic-open line;
receiving, from a position sensor, a corresponding valve position for each of the first series of differential pressure values;
calculating one or more first valve parameters for each of the first series of differential pressure values; and
generating an ICV positioning model based at least in part on the first valve parameters calculated for each of the first series of differential pressure values.

16. The tangible, non-transitory, computer-readable media of claim 15, wherein the processors are further configured to perform operations comprising:
applying a second series of differential pressure values to a hydraulic-close line;
receiving, from the position sensor, a corresponding valve position for each of the second series of differential pressure values; and
calculating one or more second valve parameters for each of the second series of differential pressure values.

17. The tangible, non-transitory, computer-readable media of claim 15, wherein the ICV positioning model is based on at least one of: a lag time, a move speed, and a response delay for each of the first series of differential pressure values.

18. The tangible, non-transitory, computer-readable media of claim 15, wherein at least one of the first valve parameters is based on a temperature of the ICV.

19. The tangible, non-transitory, computer-readable media of claim 15, wherein calculating the first valve parameters is further based on a position of one or more other ICVs.

20. The tangible, non-transitory, computer-readable media of claim 15, wherein the position sensor comprises a battery, and is configured to communicate with the surface controller via a wireless channel.

* * * * *